Feb. 20, 1962 D. D. WILCOX, JR 3,022,461

FREQUENCY AND/OR PHASE DEMODULATOR

Filed July 20, 1959

DWIGHT D. WILCOX JR.

*INVENTOR.*

*BY*

Flehr and Swain

ATTORNEYS 3,022,461

FREQUENCY AND/OR PHASE DEMODULATOR

Dwight D. Wilcox, Jr., Los Altos, Calif., assignor to Ampex Corporation, Redwood City, Calif., a corporation of California Filed July 20, 1959, Ser. No. 828,179
7 Claims. (Cl. 329—103)

This invention relates generally to a frequency or phase demodulator.

It is a general object of the present invention to provide a transistorized frequency or phase demodulator.

It is a further object of the present invention to provide a frequency or phase demodulator which contains a minimum of components and which is relatively simple in construction.

These and other objects of the invention will become more clearly apparent from the following description when taken in conjunction with the accompanying drawing.

Referring to the drawing.

Figure 1:
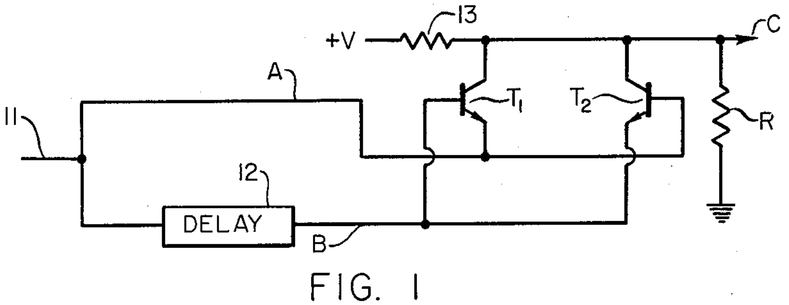
FIGURE 1 is a schematic diagram of a frequency or phase demodulator in accordance with the present invention.

Referring to FIGURE 1, the signal to be demodulated is applied to terminal 11 and directly to the line A and through a delay network 12 to the line B. The delay network is such that it is frequency sensitive, that is, it introduces a different delay or phase shift for different applied frequencies. Any suitable phase shifting network which serves to phase shift or delay the input signal is suitable.

The lines A and B are connected to the transistors $T_1$ and $T_2$. The transistors $T_1$ and $T_2$ are connected in a common collector configuration. The collectors are resistively connected to a plus voltage supply through the resistor 13. The line B is connected to the base of the transistor $T_1$ and to the emitter of the transistor $T_2$, while the line A is connected to the emitter of the transistor $T_1$ and to the base of the transistor $T_2$. The output signal is derived at the collectors of the transistors and is available across the load resistor R.

The transistors $T_1$ and $T_2$ illustrated are n-p-n transistors which serve to conduct or amplify when the base is positive with respect to the emitter. Thus, when the voltage applied to the line A is positive with respect to that applied to the line B, the transistor $T_2$ will conduct. Conversely, when the voltage applied to the line B is positive with respect to that applied to line A, the transistor $T_1$ will conduct. During conduction each transistor provides an output signal along the line C.

Figure 2A:
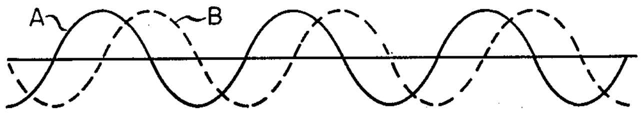
FIGURES 2A and 2B show the operation of the demodulator of FIGURE 1 in response to a sinewave input.
Figure 2B:
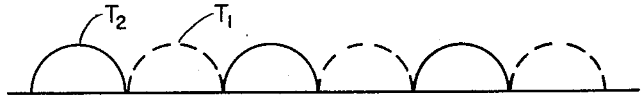

Referring to FIGURE 2A, a sinewave input signal is represented by the solid line designated A. In passing through the delay network 12, the signal is delayed as indicated by the dotted line labelled B. Thus, voltages of different phase are applied along the lines A and B to the transistors $T_1$ and $T_2$. In FIGURE 2B, the conduction of the transistors is illustrated. For a period of time it is observed that the line A will be positive with respect to the line B and that the transistor $T_2$ will conduct as indicated by the solid curve, FIGURE 2B. During the next portion of the cycle of operation, the line B is positive with respect to the line A and the transistor $T_1$ will conduct as indicated by the dotted curve, FIGURE 2B.

Thus, transistors $T_2$ and $T_1$ are conducting alternate half cycles. As the phase shift or delay is increased, the conduction becomes much heavier since the voltage applied between emitter and base will be considerably increased. As the phase decreases, the conduction will be much lighter because the voltage applied will be reduced. When the signals A and B are in phase, no conduction will result.

By employing a frequency sensitive delay network 12, the amount of conduction of the transistors $T_1$ and $T_2$ will be dependent upon the frequency of the input signal. The output signal along the line C corresponding to the rectified signal will give a true indication of the input frequency. In a practical circuit, it may become necessary to include a low-pass filter in the line C to interpolate the output wave between the conducting periods of the transistors $T_1$ and $T_2$ and thus yield an output corresponding to the input modulating wave.

Figure 3:
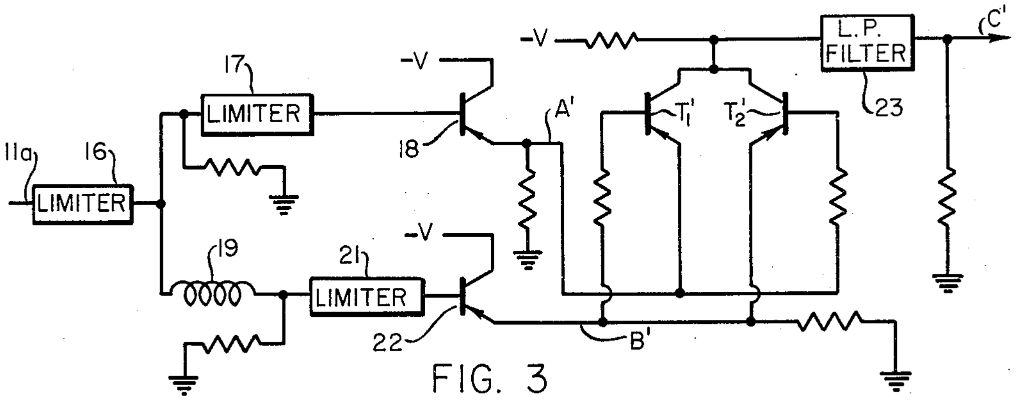
FIGURE 3 is a complete circuit diagram of a phase or frequency demodulator which includes limiting means.

It may be convenient to employ squarewaves rather than sinewaves of the type shown in FIGURES 2A and 2B. A circuit suitable for applying squarewaves to the transistors $T_1'$ and $T_2'$ is shown in FIGURE 3. The input signal is applied along the line **11*a* where it is limited by limiter 16. The output from the limiter 16 is applied to a second limiting device 17 to the base of transistor 18 connected in an emitter-follower configuration. The output from the limiter 16 is also applied through an inductor 19 to a limiter 21, and thence to the base of the transistor 22 which is connected in an emitter-follower configuration. The emitter-follower circuits 18 and 22 serve to provide a signal of relatively low impedance to the base of the transistors $T_1'$ and $T_2'$ for better operation. The additional limiting devices 17 and 21 serve to assure that the waves applied to the transistors $T_1'$ and $T_2'$ are of substantially squarewave form. The output of the demodulating circuit including the transistors $T_1'$ and $T_2'$ is applied through a low-pass filter 23** to the output terminal C.

Figure 4A:
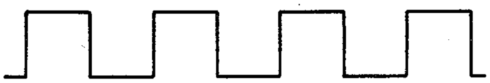
FIGURES 4A–4C show the waveforms at various points in the demodulator of FIGURE 3.
Figure 4B:
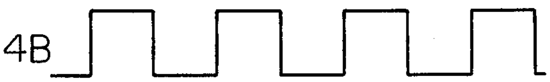
Figure 4C:
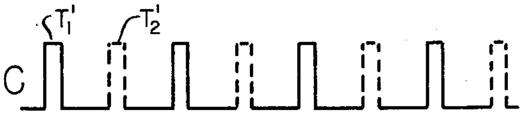

Operation of the circuit can more clearly be understood from the waveforms shown in FIGURES 4A–4C. In FIGURES 4A, the squarewave applied along the line A′ is illustrated, while in FIGURE 4B the squarewave applied along the line B′ is illustrated. At low frequencies, the inductance L is negligible and the waveforms along the lines A′ and B′ are substantially in phase. In this instance, there is no conduction of the transistors $T_1'$ and $T_2'$. As the frequency increases, the voltage along the line B′ will begin to lag the voltage along the line A′ and conduction will begin as illustrated in FIGURE 4C. As previously described, the transistors $T_1'$ and $T_2'$ will alternately conduct depending upon the polarity of the signals applied between the emitter and base. In the circuit of FIGURE 3, the conduction will be opposite to that described with respect to FIGURE 1 since the transistors $T_1'$ and $T_2'$ are p-n-p rather than n-p-n transistors and will conduct with opposite polarities applied between the emitter and base. As the lag increases, the amount of conductions of the transistors will increase until there is a 180° lag, at which time there will be continuous conduction either by one or the other of the transistors.

Each of the output pulses illustrated in FIGURE 4C represents a deliverable amount of power and the amount is a function of frequency as previously described. Thus, if the input frequency is varying, the available power will vary likewise. If the carrier and its harmonics are filtered out by the filter 23, the desired demodulated output is available at the output terminal C′.

It is apparent that although frequency modulated waves have been described that the same results will be achieved for a phase modulated wave.

I claim:

1. A demodulator comprising first and second devices having at least first and second terminals, each device serving to provide an output signal when the first terminal is positive with respect to the second terminal, means for applying a signal to be demodulated directly to the first terminal of the first device and to the second terminal of the second device, a frequency sensitive delay means serving to receive said signal to be demodulated, means for applying the signal from the frequency sensitive means to the second terminal of the first device and the first terminal of the second device, and means connected to said devices for obtaining an output signal.

2. A demodulator for demodulating a signal comprising first and second semiconductive devices having at least first, second and third electrodes, means for applying a voltage to the first electrode of each of said devices, means for applying the signal to be demodulated to the second eectrode of the first device and the third electrode of the second device, frequency sensitive delay means for receiving the signal to be demodulated, means for applying the output of the frequency sensitive means to the third electrode of the first device and the second electrode of the second device, and means for deriving an output signal connected to the first terminal of each of said devices.

3. A demodulator for demodulating a signal comprising first and second transistors each having at least emitter, base and collector electrodes, means for applying a voltage to the collector electrodes of said devices, means for applying the signal to be demodulated to the emitter electrode of the first transistor and to the base electrode of the second transistor, frequency sensitive delay means serving to receive the signal to be demodulated, means for applying the output of the frequency sensitive means to the base electrode of the first transistor and to the emitter electrode of the second transistor, and means connected to the collectors of said transistors for deriving an output signal.

4. A demodulator as in claim 3 where said means for deriving an output signal comprises a low-pass filter connected to the collectors of said transistors.

5. A demodulator for demodulating a frequency or phase modulated signal comprising first and second transistors having at least emitter, base and collector electrodes, means for receiving the input signal and serving to limit the same, means for applying the limited signal to the base of the first transistor and to the emitter of the second transistor, frequency sensitive delay means serving to receive the limited signal, means for applying the output of the frequency sensitive means to the emitter of the first transistor and to the base of the second transistor, means for applying a voltage to the collector of said transistors, and a low-pass filter connected to the collectors of said transistors and serving to derive an output signal.

6. A demodulator as in claim 5 including a pair of transistors forming an emitter-follower stage connected to receive the signal directly and the signal from the phase sensitive network and apply the same to the first and second transistors.

7. A demodulator as in claim 6 including additional limiting means serving to receive the signal from the first limiting means and from the frequency sensitive means and applying the same to the emitter-follower stage.

References Cited in the file of this patent

UNITED STATES PATENTS

| | | |
|---|---|---|
| 2,453,958 | Andresen | Nov. 16, 1948 |
| 2,585,532 | Briggs | Feb. 12, 1952 |
| 2,835,803 | Bose | May 20, 1958 |
| 2,872,595 | Pinckaers | Feb. 3, 1959 |
| 2,873,367 | Zawels | Feb. 10, 1959 |
| 2,876,382 | Sziklai | Mar. 3, 1959 |